(12) United States Patent
Itaya et al.

(10) Patent No.: US 6,853,102 B2
(45) Date of Patent: Feb. 8, 2005

(54) TURNTABLE-INTEGRATED SPINDLE MOTOR

(75) Inventors: Hideki Itaya, Matsudo (JP); Kunio Hiromasa, Matsudo (JP); Mitsuo Fujimoto, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 14 days.

(21) Appl. No.: 10/442,871

(22) Filed: May 21, 2003

(65) Prior Publication Data

US 2004/0007925 A1 Jan. 15, 2004

(30) Foreign Application Priority Data

May 22, 2002 (JP) ........................................ 2002-147526

(51) Int. Cl.[7] .............................................. H02K 11/00
(52) U.S. Cl. ................ 310/67 R; 310/156.12
(58) Field of Search ................ 310/90, 67 R, 310/156.12, 156.13, 156.26

(56) References Cited

U.S. PATENT DOCUMENTS 5,528,092 A * 6/1996 Ohta ........................ 310/67 R
6,534,880 B1 * 3/2003 Sone et al. .................. 290/1 R
6,534,889 B2 * 3/2003 Katagiri et al. ................ 310/91
6,737,781 B2 * 5/2004 Osada et al. ........... 310/156.28

* cited by examiner

Primary Examiner—Dang Le
(74) Attorney, Agent, or Firm—McGlew and Tuttle, P.C.

(57) ABSTRACT

A turntable-integrated spindle motor according to the present invention is constituted by a stator and a rotor. The rotor is constituted by a shaft 4 supported in a bearing in a cantilever support manner, a metallic rotor case 1 fixed to the shaft 4 by a boss 3, and a magnet 10 fixed to an inner circumferential surface of the rotor case 1. A plurality of projections 2 are formed integrally with the metallic rotor case so as to project from the side surface of the metallic rotor case, the projections being arranged along one circumferential line. The projections 2 perform a coming-off-prevention function by engaging with an engaging portion of a chassis 15. The rotor case 1 also functions as a turntable. In the present invention, the motor and the turntable are combined integrally with each other to obtain improved characteristics as well as to reduce the overall height. Also, projections for preventing coming off are formed integrally with the metallic rotor case to ensure high strength of the projections.

1 Claim, 3 Drawing Sheets (A) Drawing-Out by One-Side Cutting (B) Drawing-Out by Upper/Lower-Double-Side Cutting (C) Half Blanking or Simple Extrusion

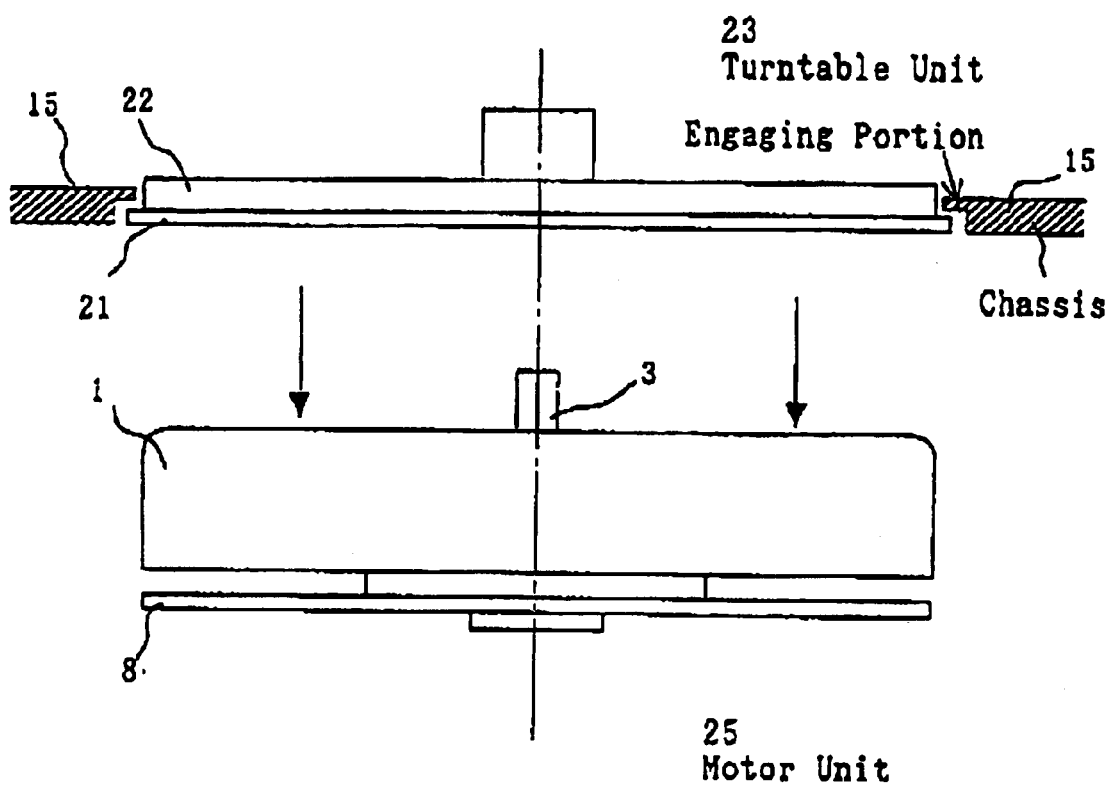

TURNTABLE-INTEGRATED SPINDLE MOTOR

BACKGROUND OF THE INVENTION

1. Field of the Invention

The present invention relates to a turntable-integrated spindle motor in which a rotor case also functions as a turntable.

2. Description of the Related Art

FIG. 4 is a diagram showing the construction of a conventional spindle motor having a turntable. The illustrated spindle motor comprises a turntable unit 23 and a motor unit 25 formed separately from each other. The turntable unit 23 comprises a turntable 22 and a ring-shaped flange 21 larger in diameter than the turntable 22. The turntable 22 and a ring-shaped flange 21 are made of a resin and formed integrally with each other. For example, the flange 21 has an outside diameter larger than the inside diameter of an engaging portion of a chassis 15 of a portable CD unit in order to have the function of preventing the turntable 22 from coming off from the chassis 15. It is difficult to make such a flange from a metal at a low cost. Therefore the flange is necessarily made of a resin. If the flange is made of a resin, the turntable unit 23 is necessarily formed separately from the motor unit, as shown in the figure.

As the motor unit 25, an outer-rotor-type motor having a cantilever bearing construction and mounted on a mount plate 8 is ordinarily used. This motor has a rotor case 1 fixed by a boss 3 to a shaft supported by a bearing provided on the stator side. The motor is combined with the turntable unit 23 by using the boss 3.

The turntable unit 23 and the motor unit 25 thus constructed separately from each other are combined integrally with each other and incorporated in a portable CD unit or the like so that the function for preventing coming off from the chassis 15 can be performed.

However, because of the coaxial two-piece construction of the resin turntable unit 23 and the motor unit 25, the conventional art entails drawbacks described below.

The overall height is increased (the assembly is thick).

In the case of a design for reducing the thickness, it is difficult to maintain the required size (thickness) of the motor unit 25, so that suitable characteristics (high torque, low current, high precision for limiting shaft whirling) cannot be achieved.

Because of the two-piece construction, the production cost is increased (in terms of parts cost and assembly cost).

Since the flange 21 of the turntable unit 23 is made of a resin, there is a risk of the flange 21 being broken by collision against the chassis 15.

SUMMARY OF THE INVENTION

In view of the above-described problems, an object of the present invention is to provide an integral motor-turntable assembly reduced in overall height and having higher characteristics (high torque, low current, high precision for limiting shaft whirling).

Another object of the present invention is to provide an integral motor-turntable assembly in which the number of component parts is reduced to limit the production cost including the parts cost and assembly cost.

Still another object of the present invention is to provide a motor-turntable assembly in which projections for preventing coming off are formed integrally with a metallic rotor case to ensure high strength.

A turntable-integrated spindle motor in accordance with the present invention comprises a stator and a rotor. The stator comprises a mount plate, a bearing housing mounted on the mount plate, a bearing held in the bearing housing, a stator core fixed on the bearing housing on outer circumference side of the same, and coils wound around portions of the stator core. The rotor comprises a shaft supported in the bearing in a cantilever support manner, a metallic rotor case fixed to the shaft by a boss, and a magnet fixed to an inner circumferential surface of the rotor case. A plurality of projections are formed integrally with the metallic rotor case so as to project from the side surface of the metallic rotor case, the projections being arranged along one circumferential line. The projections perform a coming-off-prevention function by engaging with an engaging portion of a chassis. The rotor case also functions as a turntable.

BRIEF DESCRIPTION OF THE DRAWINGS

FIG. 4 is a diagram showing the configuration of a conventional spindle motor having a turntable.

DETAILED DESCRIPTION OF THE PREFERRED EMBODIMENTS

Figure 1:
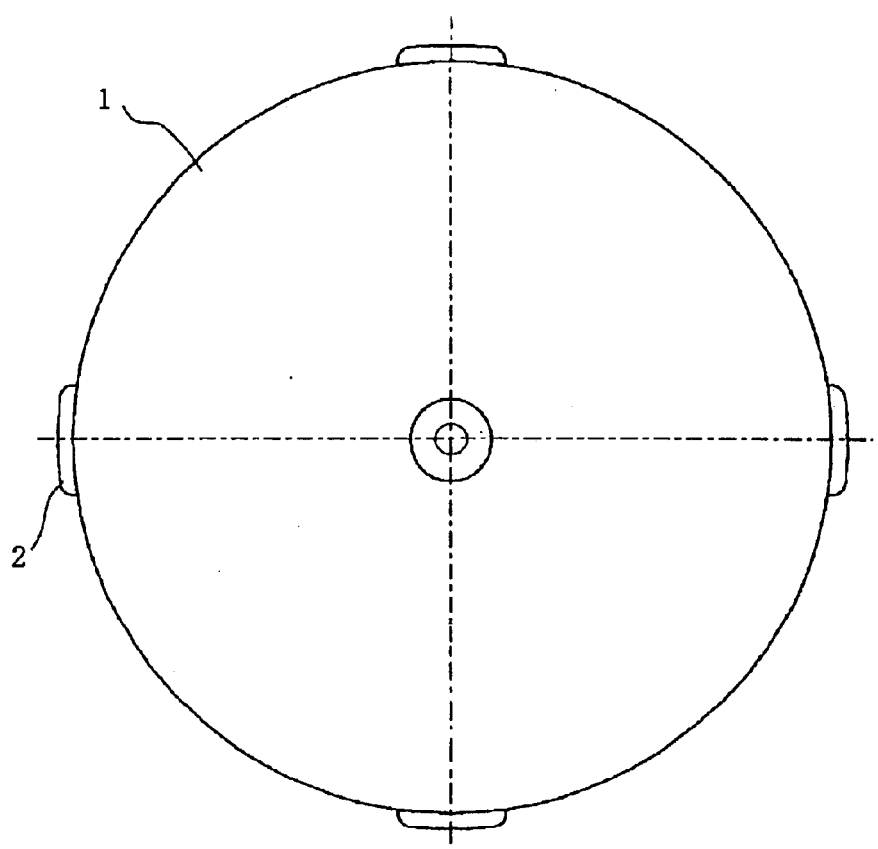
FIG. 1 a top view of a small motor which represents an embodiment of the present invention.
Figure 2:
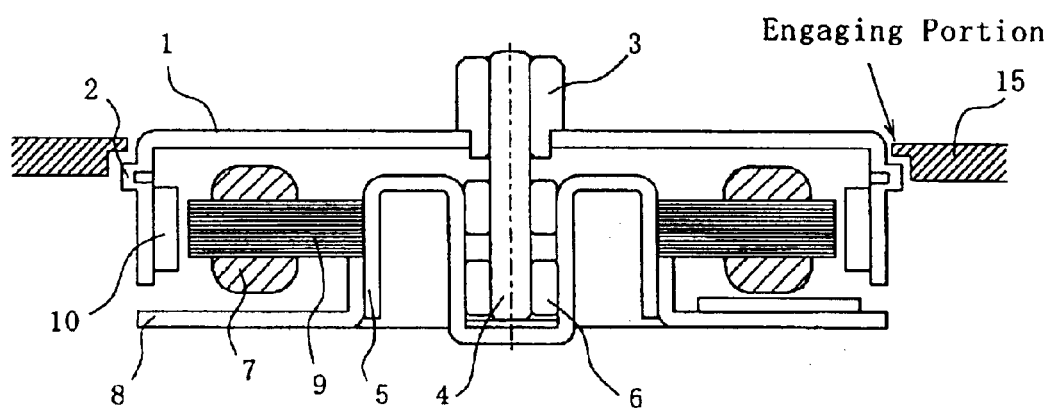
FIG. 2 is a sectional side view of the small motor shown in FIG. 1.

The present invention will be described with respect to an embodiment thereof. FIGS. 1 and 2 are a top view and a sectional side view, respectively, of a small motor which represents an embodiment of the present invention.

The illustrated small motor is an outer-rotor-type brushless spindle motor having a cantilever bearing construction. On the stator side in this small motor, a stator core 9 with coils 7 is provided on an outer peripheral portion of a bearing housing 5 mounted in a hole of a mount plate 8. The bearing housing 5 is integrally formed by drawing from one iron circular plate so as to have a central cylindrical portion having a central bottom portion and an opening, and a circular channel portion formed continuously with the central cylindrical portion on the outer circumference side of the same, the circular channel portion having a bottom and an opening positioned opposite from the central bottom portion and the opening, respectively, of the central cylindrical portion. An oil-containing bearing 6 is provided in the central cylindrical portion to support a shaft 4, and a shaft seat for supporting an end of the shaft 4 inserted through the opening of the central cylindrical portion is provided on the central bottom portion in the central cylindrical portion.

A rotor case 1 fixed to the shaft 4 at its center by a boss 3 and a drive magnet 10 mounted on the rotor case 1 constitute a rotor. The upper surface of the rotor case also functions as a turntable. The magnet 10 has a cylindrical shape such that it faces the stator core 9 in the radial direction from the outside of the stator core 9, with a gap formed therebetween. The illustrated brushless motor is provided with an electronic commutator circuit (not shown), which detects the rotating angular position of the rotor by using Hall elements or the like (not shown) and controls currents respectively flowing through the plurality of coils 7 on the basis of a detection signal indicating the detected position. The electronic commutator circuit is known per se and has no direct relation to the present invention. Therefore no further description will be made of it.

In the illustrated brushless motor, a plurality of projections 2 for preventing coming off (four projections in the illustrated example, as shown in FIG. 1) are provided on the side surface of the rotor case 1 on the outer circumference side. These projections 2 function to prevent coming off in cooperation with an engaging portion of a chassis 15, as shown in FIG. 2.

Figure 3:
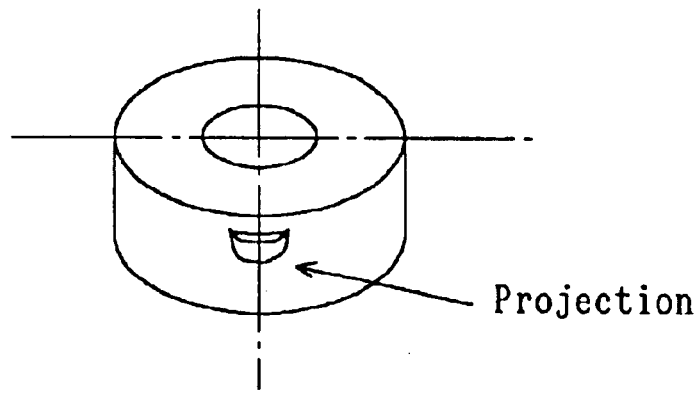
FIGS. 3A, 3B, and 3C are diagrams for explaining the formation of projections.
Figure 3:
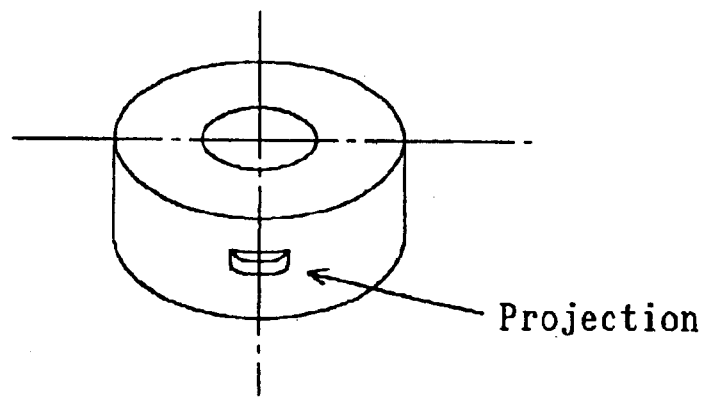
Figure 3:
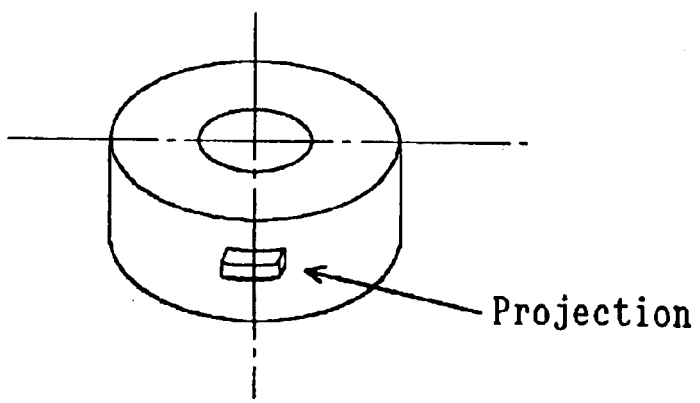

The projections 2 are integral with the iron rotor case 1. The projections 2 are formed by drawing-out (thrusting) from the side surface of the rotor case 1. FIGS. 3A, 3B, and 3C are diagrams for explaining the formation of the projections. FIG. 3A shows a case where the rotor case is cut at the upper side of each projection with respect to the shaft axial direction and the projections are formed by drawing-out. FIG. 3B shows a case where the rotor case is cut both at the upper side and at the lower side of each projection 2 with respect to the shaft axial direction and the projections are formed by drawing-out. FIG. 3C shows a case where the rotor case is cut at the upper and lower sides and at the right and left sides of each projection 2 and the projections are formed by being half extruded, i.e., by a drawing-out method called half blanking, simple extrusion or piercing.

The length of the projections in the circumferential direction and the height of the projections in the radial direction (about the shaft axis) may be selected so as to be large enough for engagement with the engaging portion of the chassis 15. It is necessary to set at least two projections along one circumferential line.

The advantages of the present invention reside in that:

the overall height can be reduced since the motor and the turntable are combined integrally each other;

an increased space can be used for the motor magnetic circuit in comparison with the case of separate-piece structure, so that improved characteristics (high torque, low current, high precision for limiting shaft whirling) can be obtained;

because of the integral structure, the number of component parts can be reduced to limit the production cost including the parts cost and the assembly cost; and because the projections are made of a metal, they are stronger than the resin flange even if their area is limited.

What is claimed is:

1. A turntable-integrated spindle motor comprising:

a stator having a mount plate, a bearing housing mounted on the mount plate, a bearing held in the bearing housing, a stator core fixed on the bearing housing on outer circumference side of the same, and coils wound around portions of the stator core; and a rotor having a shaft supported in said bearing in a cantilever support manner, a metallic rotor case fixed to the shaft by a boss, and a magnet fixed to an inner circumferential surface of the rotor case, wherein a plurality of projections are formed integrally with said metallic rotor case so as to project from the side surface of said metallic rotor case, the projections being arranged along one circumferential line; the projections perform a coming-off-prevention function by engaging with an engaging portion of a chassis; and said rotor case also functions as a turntable.

* * * * *